(12) United States Patent
Hagiwara et al.

(10) Patent No.: US 12,139,585 B2
(45) Date of Patent: Nov. 12, 2024

(54) SILICONE PARTICLE AND METHOD FOR PRODUCING THE SAME

(71) Applicant: SHIN-ETSU CHEMICAL CO., LTD., Tokyo (JP)

(72) Inventors: Mamoru Hagiwara, Annaka (JP); Kazuyuki Takewaki, Annaka (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 78 days.

(21) Appl. No.: 17/781,861

(22) PCT Filed: Oct. 23, 2020

(86) PCT No.: PCT/JP2020/039919
§ 371 (c)(1),
(2) Date: Jun. 2, 2022

(87) PCT Pub. No.: WO2021/111757
PCT Pub. Date: Jun. 10, 2021

(65) Prior Publication Data
US 2023/0032726 A1    Feb. 2, 2023

(30) Foreign Application Priority Data
Dec. 5, 2019  (JP) ................................ 2019-220564

(51) Int. Cl.
C08G 77/20      (2006.01)
C08F 283/12     (2006.01)
C08J 3/12       (2006.01)

(52) U.S. Cl.
CPC .......... *C08G 77/20* (2013.01); *C08F 283/124* (2013.01); *C08J 3/12* (2013.01); *C08J 2383/07* (2013.01)

(58) Field of Classification Search
CPC .................................................... C08G 77/20
See application file for complete search history.

(56) References Cited

U.S. PATENT DOCUMENTS

| | | | |
|---|---|---|---|
| 4,962,165 A | 10/1990 | Bortnick et al. | |
| 5,708,057 A | 1/1998 | Morita et al. | |
| 5,871,761 A | 2/1999 | Kuwata et al. | |
| 6,928,660 B2 | 8/2005 | Park et al. | |
| 2009/0234089 A1* | 9/2009 | Ueyama ................... | C08F 8/42 |
| | | | 526/279 |
| 2010/0209707 A1 | 8/2010 | Morita et al. | |
| 2015/0050498 A1 | 2/2015 | Inokuchi | |
| 2015/0329678 A1 | 11/2015 | Inokuchi et al. | |
| 2017/0022327 A1 | 1/2017 | Bao et al. | |

FOREIGN PATENT DOCUMENTS

| | | |
|---|---|---|
| CN | 101932632 A | 12/2010 |
| CN | 104220491 A | 12/2014 |
| CN | 106459585 A | 2/2017 |
| EP | 2 241 587 A1 | 10/2010 |
| JP | H02-228313 A | 9/1990 |
| JP | H05-009409 A | 1/1993 |
| JP | H09-255793 A | 9/1997 |
| JP | H10-139624 A | 5/1998 |
| JP | H10-175816 A | 6/1998 |
| JP | H11-140191 A | 5/1999 |
| JP | 2008-285552 A | 11/2008 |
| JP | 2016-505081 A | 2/2016 |
| JP | 2016-199712 A | 12/2016 |
| WO | 2009/099164 A1 | 8/2009 |
| WO | WO-2020075582 A1 * | 4/2020 |

OTHER PUBLICATIONS

WO-2020075582, machine translation. (Year: 2020).*
Oct. 12, 2023 Office Action and Search Report Issued in Chinese Patent Application No. 202080084158.5.
Apr. 3, 2024 Extend Search Report issued in European Patent Application No. 20897557.3.
Dec. 28, 2020 International Search Report issued in International Patent Application No. PCT/JP2020/039919.
May 17, 2022 International Preliminary Report on Patentability issued in International Patent Application No. PCT/JP2020/039919.

* cited by examiner

*Primary Examiner* — Robert A Vetere
(74) *Attorney, Agent, or Firm* — Oliff PLC

(57) ABSTRACT

A silicone particle containing: a dialkylsiloxane unit represented by the following general formula (1), $R^4{}_2SiO_{2/2}$ (1), where, in the formula (1), $R^4$s each independently represent a monovalent hydrocarbon group having 1 to 6 carbon atoms; and a poly(alkyleneoxyalkyl)methylsiloxane unit represented by the following general formula (2), where, in the formula (2), $R^1$s each independently represent a hydrogen atom or a monovalent hydrocarbon group having 1 to 6 carbon atoms, $R^2$s each independently represent a divalent aliphatic group having 1 to 6 carbon atoms, and "n" is a number that satisfies $1 \leq n \leq 20$, where the silicone particle has an oxyalkylene group in a surface thereof. A silicone particle may be readily dispersed in an aqueous material without the use of a dispersant or a surfactant, the silicone particle having a hydrophilic group.

(2)

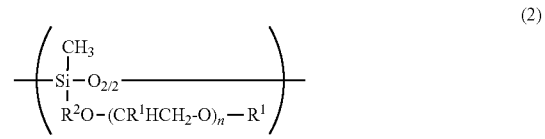

18 Claims, No Drawings

SILICONE PARTICLE AND METHOD FOR PRODUCING THE SAME

TECHNICAL FIELD

The present invention relates to: a silicone particle; and a method for producing the same.

BACKGROUND ART

Patent Document 1 proposes a crosslinked silicone particle. Furthermore, Patent Document 2 proposes adding this silicone particle to an aqueous coating composition in order to provide a coating film with delustering properties. In addition, Patent Document 3 and Patent Document 4 propose adding the silicone particle to an aqueous cosmetic in order to improve the feeling on use of the cosmetic.

When used as a cosmetic, conventional silicone particles are used for the purpose of imparting dry or smooth feeling on use, etc., spreadability, soft focus effect, and so forth. However, silicone is a material having high water repellency, and there is a problem that it is difficult to disperse silicone in an aqueous cosmetic.

When any of the above-described silicone particles are used to obtain an aqueous suspension in which water is a dispersion medium, a nonionic surfactant, an anionic surfactant, a cationic surfactant, a zwitterionic surfactant, or a surfactant produced from a mixture of these surfactants is used for stabilizing the suspension.

Particularly, for use in cosmetics, it is necessary to select a surfactant that has little effect on the environment while improving the stability of these suspensions and emulsions themselves and improving dispersibility in a composition. Alkyl polyether having an alkyl group having 12 to 15 carbon atoms is considered to be a chemical substance whose effect on the environment raises concerns, and is a designated chemical substance of the PRTR (Pollutant Release and Transfer Register). The reporting of the discharged amount, etc. of such alkyl polyether is made compulsory in accordance with the PRTR, and use of the alkyl polyether is becoming restricted.

In addition, since surfactant raises concerns of irritation to skin, use of a surfactant is sometimes avoided in cosmetics that are externally applied to skin, in particular, skin care cosmetics, make-up cosmetics, antiperspirant cosmetics, UV care cosmetics, etc.

As a means for avoiding such use of a surfactant, Patent Document 5 proposes a surfactant-free aqueous dispersion of silicone particles. However, the surface treatment process after producing the silicone particles is complicated, and high costs are involved, so that there has been a problem that the dispersion can only be used for some high-cost uses.

As an example of introducing a hydrophilic group to the surface of a silicone particle in the manner of a chemical bond, Patent Document 6 considers the introduction of an amino group to the surface of a silicone particle. However, the water dispersibility and stability of the silicone particles are not reported.

CITATION LIST

Patent Literature

Patent Document 1: JP H11-140191 A
Patent Document 2: JP H05-009409 A
Patent Document 3: JP H10-139624 A
Patent Document 4: JP H10-175816 A
Patent Document 5: JP 2016-505081 A
Patent Document 6: JP 2008-285552 A

SUMMARY OF INVENTION

Technical Problem

The present invention has been made in view of the above-described problems. An object of the present invention is to provide: a silicone particle that may be readily dispersed in an aqueous material without the use of a dispersant or a surfactant, the silicone particle having a hydrophilic group; and a method for producing the silicone particle.

Solution to Problem

To achieve the object, the present invention provides a silicone particle comprising:

a dialkylsiloxane unit represented by the following general formula (1),

wherein in the formula (1), $R^4$s each independently represent a monovalent hydrocarbon group having 1 to 6 carbon atoms; and a poly(alkyleneoxyalkyl)methylsiloxane unit represented by the following general formula (2),

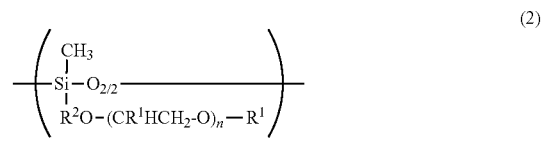

wherein in the formula (2), $R^1$s each independently represent a hydrogen atom or a monovalent hydrocarbon group having 1 to 6 carbon atoms, $R^2$s each independently represent a divalent aliphatic group having 1 to 6 carbon atoms, and "n" is a number that satisfies $1 \leq n \leq 20$, wherein the silicone particle has an oxyalkylene group in a surface thereof.

Such a silicone particle has an oxyalkylene group in the surface. Therefore, the silicone particle may be readily dispersed in an aqueous material without the use of a dispersant or a surfactant.

In this event, the silicone particle preferably has a volume average particle size of 0.1 to 100 μm.

When the silicone of the present invention has such a volume average particle size, dispersibility in an aqueous material can be made favorable.

In addition, the present invention provides a method for producing one of the silicone particles described above, the method comprising crosslinking, in a state of being dispersed in water, a radical polymerizable silicone composition containing the following components (A) to (C):

(A) 100 parts by mass of an organopolysiloxane having a radical polymerization reactive group shown in the following general formula (3),

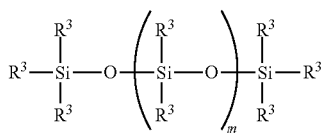
(3)

wherein in the formula (3), $R^3$s each independently represent a monovalent hydrocarbon group having 1 to 6 carbon atoms or a group represented by the following general formula (4a) or (4b), provided that at least one group represented by the following formula (4a) or (4b) is contained in one molecule, and "m" is a number that satisfies $0 \le m \le 1,000$,

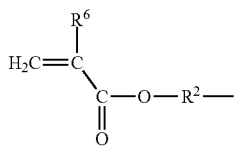
(4a)

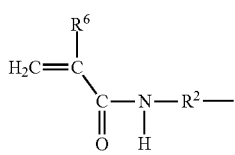
(4b)

wherein in the formulae (4a) and (4b), $R^6$ represents a hydrogen atom or a methyl group and $R^2$ represents a divalent aliphatic group having 1 to 6 carbon atoms; (B) 0.1 to 100 parts by mass of a polyoxyalkylene-modified silicone having a radical polymerizable group shown in the following general formula (5),

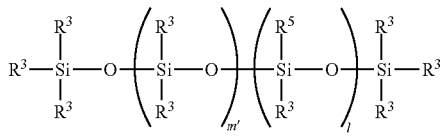
(5)

wherein in the formula (5), $R^3$ is as defined above and at least two groups represented by the following formula (4a) or (4b) are contained in one molecule, $R^5$ represents a polyethyleneoxyalkyl group represented by the following formula (7), "l" is a number that satisfies $1 \le l \le 300$, and "m'" is a number that satisfies $1 \le m' \le 1,000$,

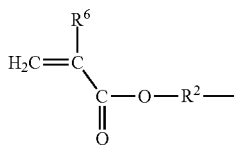
(4a)

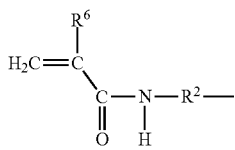
(4b)

wherein in the formulae (4a) and (4b), $R^6$ and $R^2$ are as defined above, $$-R^2O(CR^1HCH_2O)n\text{-}R^1 \quad (7)$$

wherein in the formula (7), $R^1$s each independently represent a hydrogen atom or a monovalent hydrocarbon group having 1 to 6 carbon atoms, $R^2$s each independently represent a divalent aliphatic group having 1 to 6 carbon atoms, and "n" is a number that satisfies $1 \le n \le 20$; and (C) 0.1 to 5 parts by mass of a radical generator.

According to such a method for producing the silicone particle, the above-described silicone particles can be produced efficiently.

In this case, an organopolysiloxane having a radical polymerization reactive group shown in the following general formula (8) is preferably used as the component (A),

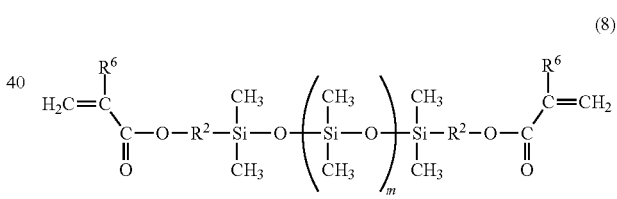
(8)

wherein in the formula (8), $R^2$ and $R^6$ are as defined above and "m" is a number that satisfies $0 \le m \le 1,000$.

More specifically, such an organopolysiloxane is preferably used as the component (A) in the present invention.

Furthermore, a polyoxyalkylene-modified silicone having a radical polymerizable group shown in the following structural formula (9) is preferably used as the component (B),

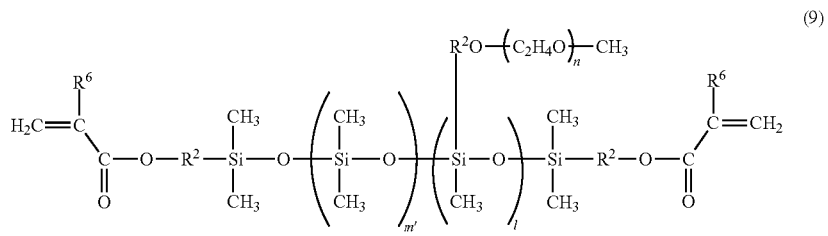
(9)

wherein in the formula (9), $R^2$ and $R^6$ are as defined above, "l" is a number that satisfies $1 \leq l \leq 300$, "m'" is a number that satisfies $1 \leq m' \leq 1{,}000$, and "n" is a number that satisfies $1 \leq n \leq 20$.

More specifically, such a polyoxyalkylene-modified silicone is preferably used as the component (B) in the present invention.

Furthermore, in the inventive method for producing the silicone particle, the composition is preferably cured by a heating method, a redox method, or a light irradiation method in the presence of the component (C) radical generator.

In the inventive method for producing the silicone particle, these curing methods can be employed suitably.

Advantageous Effects of Invention

The inventive silicone particle has an oxyalkylene group (hydrophilic group) in the surface. Therefore, the silicone particle may be readily dispersed in an aqueous material without the use of a dispersant, typically, a surfactant. For example, for use in aqueous cosmetics that are externally applied to skin, such as skin care cosmetics, make-up cosmetics, antiperspirant cosmetics, and UV care cosmetics, there is no need to use a surfactant specially for blending the inventive silicone particle. Therefore, it is possible to obtain a product having no risk of skin irritation. Moreover, in aqueous paints and inks, it is unnecessary to add further surfactant for dispersing the silicone particles thereinto, thereby solving the problems of coating film strength being degraded and bubbles not easily disappearing.

In addition, the inventive method for producing the silicone particle makes it possible to produce such silicone particles efficiently.

DESCRIPTION OF EMBODIMENTS

As described above, an object of the present invention is to provide a silicone particle that may be readily dispersed in an aqueous material without the additional use of a dispersant or a surfactant, the silicone particle having a hydrophilic group.

To achieve the object, the present inventors have earnestly studied and found out that it is possible to obtain a silicone particle having a hydrophilic group in a surface thereof and that the silicone particle can be readily dispersed in water by the following means: emulsifying an organopolysiloxane having a radical polymerization reactive group while using a polyoxyalkylene-modified silicone having a radical polymerizable group as an emulsifier; and subjecting the emulsion to emulsion polymerization and crosslinking.

Hereinafter, embodiments of the present invention will be described, but the present invention is not limited thereto.

[Silicone Particle]

Firstly, the inventive silicone particle will be described in detail.

The inventive silicone particle contains:

a dialkylsiloxane unit represented by the following general formula (1),

where, in the formula (1), $R^4$s each independently represent a monovalent hydrocarbon group having 1 to 6 carbon atoms; and a poly(alkyleneoxyalkyl)methylsiloxane unit represented by the following general formula (2),

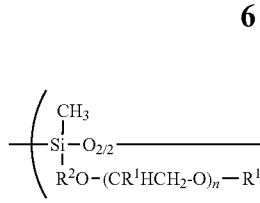

where, in the formula (2), $R^1$s each independently represent a hydrogen atom or a monovalent hydrocarbon group having 1 to 6 carbon atoms, $R^2$s each independently represent a divalent aliphatic group having 1 to 6 carbon atoms, and "n" is a number that satisfies $1 \leq n \leq 20$, where the silicone particle has an oxyalkylene group in a surface thereof.

As described above, in the general formula (1), $R^4$s each independently represent a monovalent hydrocarbon group having 1 to 6 carbon atoms. Specific examples of $R^4$ include alkyl groups such as a methyl group, an ethyl group, a propyl group, a butyl group, a pentyl group, and a hexyl group; cycloalkyl groups such as a cyclopentyl group and a cyclohexyl group; and aryl groups such as a phenyl group. A methyl group and a phenyl group are preferable.

Meanwhile, in the general formula (2), as described above, $R^1$s each independently represent a hydrogen atom or a monovalent hydrocarbon group having 1 to 6 carbon atoms. Specific examples of the monovalent hydrocarbon group having 1 to 6 carbon atoms of $R^1$ include a methyl group, an ethyl group, a propyl group, a butyl group, a pentyl group, and a hexyl group, and $R^1$ is preferably a hydrogen atom or a methyl group. In addition, in the general formula (2), as described above, $R^2$s each independently represent a divalent aliphatic group having 1 to 6 carbon atoms. Specific examples of $R^2$ include alkylene groups such as an ethylene group, a methylethylene group, a propylene group, a butylene group, a pentylene group, and a hexylene group, preferably an ethylene group or a propylene group. In addition, in the formula (2), "n" is a number that satisfies $1 \leq n \leq 20$, preferably $3 \leq n \leq 15$.

The inventive silicone particle as described may be readily dispersed in an aqueous material without the use of a dispersant or a surfactant. Such a silicone particle has an oxyalkylene group in a surface thereof, and therefore, can be obtained as a hydrophilic silicone particle having good properties. Specifically, the silicone particle has higher hydrophilicity, causes less skin irritation, and is suitable for cosmetics. Furthermore, regarding the formulation composition when using such silicone particles, there are no restrictions to combinations with anionic surfactants, cationic surfactants, and zwitterionic surfactants.

As described above, the inventive silicone particle has a polydialkylsiloxane containing a polyoxyalkylene unit crosslinked in the surface of the silicone particle. The inventive silicone particle preferably has a volume average particle size of 0.1 to 100 μm, more preferably 0.5 to 40 μm, further preferably 1 to 20 μm. When the silicone particles have a volume average particle size of 0.1 μm or more, the silicone particles do not agglomerate too much, so that the silicone particles may be readily dispersed to primary particles in a dispersion medium. Meanwhile, when the silicone particles have a volume average particle size of 100 μm or less, the silicone particles can be used for a wide variety of uses. That is, when the silicone particles have a volume average particle size of 0.1 to 100 μm, dispersibility of the silicone particles is good, so that the silicone particles can be used for various uses such as cosmetics and aqueous paints and inks.

Note that the volume average particle size of spherical silicone particles is measured by a method appropriately selected from microscopy, light scattering method, laser diffraction method, liquid sedimentation method, electric resistance method, etc. in accordance with the particle size of the silicone particles. For example, when the particle size is 0.1 μm or more and 1 μm or less, the volume average particle size may be measured by a light scattering method, and when within the range of 1 to 100 μm, the volume average particle size may be measured by an electric resistance method. In addition, in the present description, "spherical" indicates not only particles in the shape of spheres, but also includes deformed ellipsoids having an average "length of major axis/length of minor axis" (aspect ratio) of usually within the range of 1 to 4, preferably 1 to 2, more preferably 1 to 1.6, and further preferably 1 to 1.4. The shapes of the particles can be confirmed by observing the particles with an optical microscope or an electron microscope.

[Method for Producing Silicone Particle]

Such a silicone particle can be obtained by crosslinking, in a state of being dispersed in water, a radical polymerizable silicone composition containing the following components (A) to (C).

(A) 100 parts by mass of an organopolysiloxane having a radical polymerization reactive group shown in the following general formula (3)

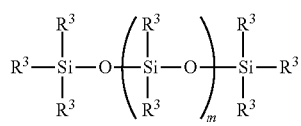
(3)

In the formula (3), $R^3$s each independently represent a monovalent hydrocarbon group having 1 to 6 carbon atoms or a group represented by the following general formula (4a) or (4b), provided that at least one group represented by the following formula (4a) or (4b) is contained in one molecule. "m" is a number that satisfies $0 \leq m \leq 1,000$.

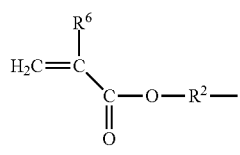
(4a)

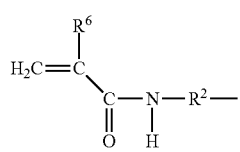
(4b)

In the formulae (4a) and (4b), $R^6$ represents a hydrogen atom or a methyl group and $R^2$ represents a divalent aliphatic group having 1 to 6 carbon atoms.

(B) 0.1 to 100 parts by mass of a polyoxyalkylene-modified silicone having a radical polymerizable group shown in the following general formula (5)

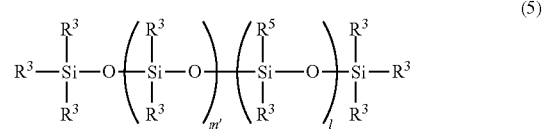
(5)

In the formula (5), $R^3$ is as defined above and at least two groups represented by the following formula (4a) or (4b) are contained in one molecule. $R^5$ represents a polyethylene-oxyalkyl group represented by the following formula (7). "l" is a number that satisfies $1 \leq l \leq 300$ and "m'" is a number that satisfies $1 \leq m' \leq 1,000$.

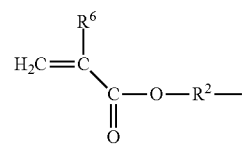
(4a)

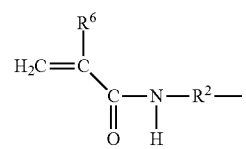
(4b)

In the formulae (4a) and (4b), $R^6$ and $R^2$ are as defined above.

—$R^2O(CR^1HCH_2O)n$-$R^1$ (7)

In the formula (7), $R^1$s each independently represent a hydrogen atom or a monovalent hydrocarbon group having 1 to 6 carbon atoms, $R^2$s each independently represent a divalent aliphatic group having 1 to 6 carbon atoms. "n" is a number that satisfies $1 \leq n \leq 20$.

(C) 0.1 to 5 parts by mass of a radical generator

Hereinafter, the components (A) to (C) will be described.

[Component (A)]

Firstly, the component (A) is an organopolysiloxane having a radical polymerization reactive group shown in the following general formula (3).

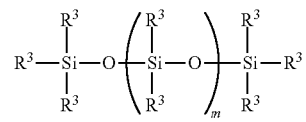
(3)

In the formula (3), $R^3$s each independently represent a monovalent hydrocarbon group having 1 to 6 carbon atoms or a group represented by the following general formula (4a) or (4b), provided that at least one group represented by the following formula (4a) or (4b) is contained in one molecule, and "m" is a number that satisfies $0 \leq m \leq 1,000$.

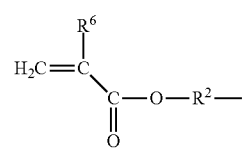
(4a)

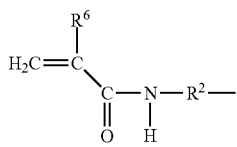
(4b)

In the formulae (4a) and (4b), $R^6$ represents a hydrogen atom or a methyl group and $R^2$ represents a divalent aliphatic group having 1 to 6 carbon atoms.

As described above, $R^3$s in the general formula (3) each independently represent a monovalent hydrocarbon group having 1 to 6 carbon atoms or a group represented by the general formula (4a) or (4b). The monovalent hydrocarbon group may be linear, branched, or cyclic, and examples thereof include alkyl groups such as methyl, ethyl, n-propyl, isopropyl, n-butyl, isobutyl, tert-butyl, n-hexyl, and cyclohexyl; aryl groups such as a phenyl group; etc. Among these monovalent hydrocarbon groups, alkyl groups having 1 to 6 carbon atoms and aryl groups are preferable, and a methyl group, an ethyl group, and a phenyl group are more preferable.

Furthermore, at least one of the $R^3$s in the general formula (3) is a group represented by the formula (4a) or (4b). $R^6$ in the formula (4a) or (4b) is preferably a hydrogen atom or a methyl group. In addition, $R^2$ in the formula (4a) or (4b) represents a divalent aliphatic group having 1 to 6 carbon atoms, and may be linear, branched, or cyclic. Specific examples thereof include alkylene groups such as a methylene group, an ethylene group, a propylene group, a butylene group, isobutylene, a pentylene group, and a hexylene group. In particular, a methylene group, an ethylene group, and a propylene group are preferable, and a propylene group is more preferable.

Furthermore, "m" is a number that satisfies $0 \leq m \leq 1{,}000$, preferably $10 \leq m \leq 500$. When "m" is 1,000 or less, viscosity is not too high, so that excellent workability can be achieved.

The value of "m" can be calculated, for example, as an average value by $^{29}$Si-NMR measurement or the like. Alternatively, "m" can be determined from a number-average molecular weight in terms of polystyrene in gel permeation chromatography (GPC) analysis.

As the component (A), it is preferable to use an organopolysiloxane having a radical polymerization reactive group shown in the following general formula (8).

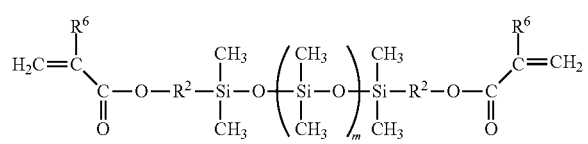
(8)

In the formula (8), $R^2$ and $R^6$ are as defined above and "m" is a number that satisfies $0 \leq m \leq 1{,}000$.

Examples of the component (A) organopolysiloxane include the compounds of the following formulae.

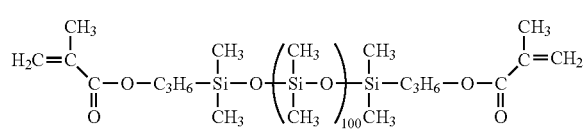

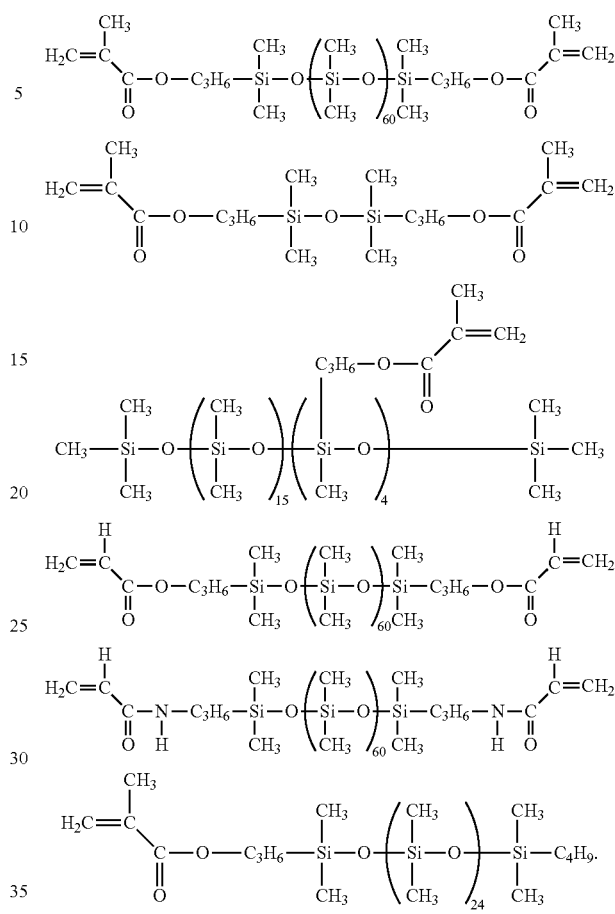

[Component (B)]

Next, the component (B) is a polyoxyalkylene-modified silicone having a radical polymerizable group shown in the following general formula (5).

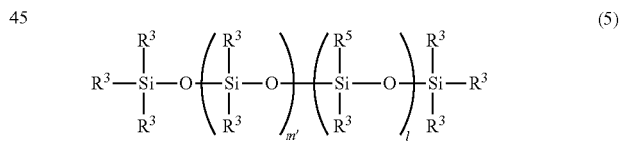
(5)

In the formula (5), $R^3$ is as defined above and at least two groups represented by the following formula (4a) and/or (4b) are contained in one molecule. $R^5$ represents a polyethyleneoxyalkyl group represented by the following formula (7). "l" is a number that satisfies $1 \leq l \leq 300$ and "m'" is a number that satisfies $1 \leq m' \leq 1{,}000$.

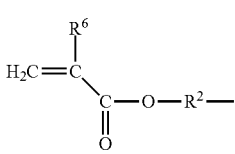
(4a)

-continued

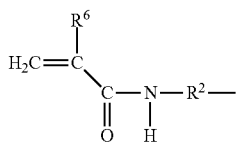
(4b)

In the formulae (4a) and (4b), $R^6$ and $R^2$ are as defined above.

(7)

In the formula (7), $R^1$s each independently represent a hydrogen atom or a monovalent hydrocarbon group having 1 to 6 carbon atoms, $R^2$s each independently represent a divalent aliphatic group having 1 to 6 carbon atoms, and "n" is a number that satisfies $1 \le n \le 20$.

The component (B) polyoxyalkylene-modified silicone having a radical polymerizable group (radical polymerization reactive group) can emulsify and disperse the component (A) in water, and has a radical polymerizable group. That is, the component (B) can be said to act as a surfactant in the reaction. One kind of the component (B) (surfactant) can be used, or two or more kinds thereof can be used in appropriate combination.

Furthermore, when a polyoxyalkylene-modified silicone having a radical polymerizable group is used as described, the emulsification stability of the emulsion can be improved. In addition, the surfactant to be fixed to a surface of a produced hydrophilic silicone particle can be a nonionic surfactant. In this manner, a hydrophilic silicone particle having favorable properties can be achieved.

As the component (B), it is preferable to use a polyoxyalkylene-modified silicone having a radical polymerizable group shown in the following structural formula (9).

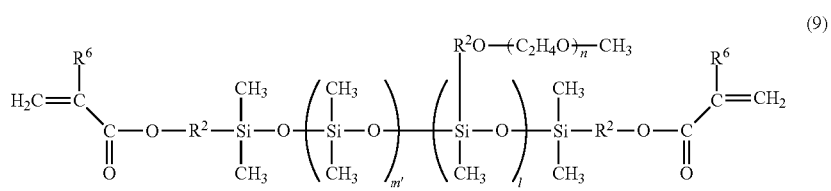
(9)

In the formula (9), $R^2$ and $R^6$ are as defined above, "l" is a number that satisfies $1 \le l \le 300$, "m'" is a number that satisfies $1 \le m' \le 1,000$, and "n" is a number that satisfies 1 n 20.

Examples of the component (B) polyoxyalkylene-modified silicone include the compounds of the following formulae.

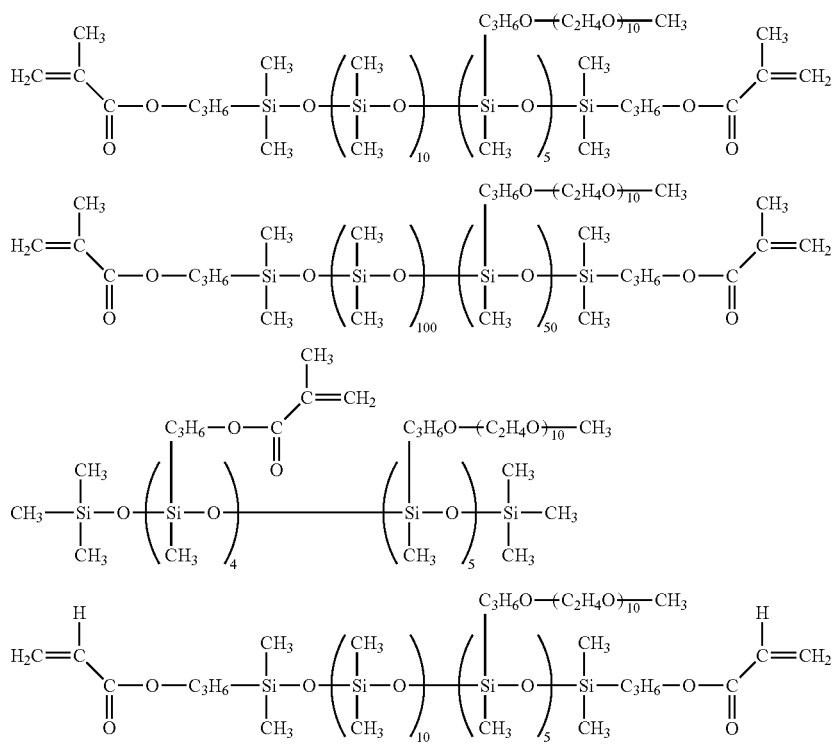

-continued

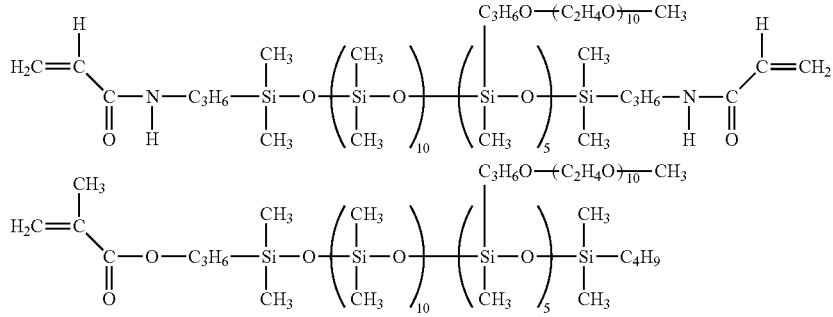

The component (B) is contained in an amount within a range of 0.1 to 100 parts by mass, preferably 5 to 15 parts by mass based on 100 parts by mass of the component (A). This is because if the contained amount of the component (B) is less than 0.1 parts by mass, the dispersibility of the obtained crosslinked silicone particles in water is degraded, and on the other hand, if the contained amount is over 100 parts by mass, the obtained silicone particles become too small.

[(C) Radical Generator]

The component (C) is a radical generator. In the inventive method for producing the silicone particle, the composition is preferably cured by a heating method, a redox method, or a light irradiation method in the presence of the component (C) radical generator.

Examples of the radical generator used in the emulsion polymerization include peroxides, azo initiators, redox initiators having a combination of an oxidizing agent and a reducing agent, photopolymerization initiators, etc.

Examples of the peroxides include benzoyl peroxide, 2,4-dichlorobenzoyl peroxide, o-methylbenzoyl peroxide, p-methylbenzoyl peroxide, 2,4-dicumyl peroxide, 2,5-dimethyl-2,5-di(t-butylperoxy)hexane, di-t-butylperoxide, t-butylperbenzoate, etc.

Examples of the azo initiators include 2,2'-azobisisobutyronitrile, 2,2'-azobis(2,4-dimethylvaleronitrile), dimethyl-2,2'-azobis(2-methylpropionate), dimethyl-2,2'-azobisisobutyrate, etc.

Examples of the redox initiators include a combination of ferrous sulfate, sodium pyrophosphate, glucose, and hydroperoxide; and a combination of ferrous sulfate, disodium ethylenediaminetetraacetate, Rongalite, and hydroperoxide.

Examples of the photopolymerization initiators include 2,2-diethoxyacetophenone, 2,2-dimethoxy-1,2-diphenylethan-1-one (Irgacure 651 manufactured by BASF), 1-hydroxy-cyclohexyl-phenyl-ketone (Irgacure 184 manufactured by BASF), 2-hydroxy-2-methyl-1-phenyl-propan-1-one (Irgacure 1173 manufactured by BASF), 2-hydroxy-1-{4-[4-(2-hydroxy-2-methyl-propionyl)-benzyl]-phenyl}-2-methyl-propan-1-one (Irgacure 127 manufactured by BASF), phenyl glyoxylic acid methyl ester (Irgacure MBF manufactured by BASF), 2-methyl-1-[4-(methylthio)phenyl]-2-morpholinopropan-1-one (Irgacure 907 manufactured by BASF), 2-benzyl-2-dimethylamino-1-(4-morpholinophenyl)-1-butanone (Irgacure 369 manufactured by BASF), bis(2,4,6-trimethylbenzoyl)-phenylphosphine oxide (Irgacure 819 manufactured by BASF), 2,4,6-trimethylbenzoyl-diphenylphosphine oxide (Irgacure TPO manufactured by BASF), mixtures thereof, etc.

Out of the components (C), the following are preferable in view of compatibility with the component (A). 2,2-diethoxyacetophenone, 2-hydroxy-2-methyl-1-phenyl-propan-1-one (Irgacure 1173 manufactured by BASF), bis(2,4,6-trimethylbenzoyl)-phenylphosphine oxide (Irgacure 819 manufactured by BASF), and 2,4,6-trimethylbenzoyl-diphenylphosphine oxide (Irgacure TPO manufactured by BASF).

The amount of the component (C) added is within the range of 0.1 to 5 parts by mass based on 100 parts by mass of (A). If the added amount is less than 0.1 parts by mass, curability is insufficient, and if the component (C) is added in an amount of more than 5 parts by mass, problems such as odor and bleeding occur due to the reaction residue and so forth being mixed in (contamination).

In the inventive production method, it is possible to prepare a crosslinkable organopolysiloxane composition containing the components (A) to (C) first, and then crosslink the composition in a state of being dispersed in water. Alternatively, it is also possible to prepare a mixture of the components (A) and (B), disperse this in water, then add the component (C) and perform the crosslinking. In the latter case, the component (C) is preferably added as an aqueous dispersion in which the component (C) is dispersed with an average particle size of 10 μm or less in water.

When water is used as a dispersion medium, the water is preferably added in an amount of 20 to 1500 parts by mass based on 100 parts by mass of the crosslinkable silicone composition.

[Other Additives]

To the emulsion used in the inventive method for producing the silicone particle, various additives can be blended as necessary besides the components (A) to (C). Examples include thickeners, preservatives, pH adjusting agents, antioxidants, polymerization inhibitors, etc., and regarding each of these, one kind may be used, or an appropriate combination of two or more kinds may be used in appropriate amounts.

In the inventive production method, a dispersion of a radical polymerizable organopolysiloxane composition containing the components (A) to (C) may be prepared, and then a radical polymerization reaction may be performed. Alternatively, a dispersion of a mixture containing the components (A) and (B) may be prepared, and then the radical generator (C) may be added to perform a radical polymerization.

For dispersing the radical polymerizable organopolysiloxane composition in the dispersion medium homogeneously, a common emulsifying and dispersing apparatus can be used. Examples of the emulsifying apparatus include a homomixer, paddle mixer, Henschel mixer, homogenizing disper, colloid mill, propeller-type agitator, homogenizer, in-line-type continuous emulsifier, ultrasonic emulsifier, vacuum-type continuous mixer, etc.

The emulsion obtained in this manner is subjected to radical polymerization to prepare a dispersion of silicone particles.

When a photopolymerization initiator is used as the radical generator, the crosslinking can be performed by inserting a UV irradiation probe directly into the above-described dispersion of the crosslinkable organopolysiloxane composition or slurry, and performing polymerization for a predetermined time. As the light source of the UV irradiation probe, LED light sources or mercury lamp light sources of various wavelengths can be used, and it is possible to use a light source having a wavelength range in an absorption wavelength of the photopolymerization initiator.

Subsequently, by removing the dispersion medium, unreacted component (B), and so forth from this dispersion or slurry, silicone particles can be obtained.

When the dispersion medium is water, examples of methods for removing the unreacted component (B) and so forth include: a method of concentrating the dispersion by a method such as dehydration by heat, filtration, centrifugation, decantation, etc., then washing with water if necessary, and furthermore, heating and drying under normal pressure or reduced pressure; a method of performing the heating and drying by spraying the dispersion in a flow of hot air; and a method of performing the heating and drying by using a flow of hot medium. In addition, methods for removing the dispersion medium by solidifying the dispersion and then reducing pressure include freeze-drying. If the crosslinked silicone particles obtained by removing the dispersion medium is agglomerated, the particles may be pulverize with a mortar, a jet mill, or the like.

Furthermore, a silicone particle produced by the inventive method for producing the silicone particle has a polyoxyalkylene group fixed to the particle surface by a chemical bond produced by radical polymerization. In addition, a polyoxyalkylene-modified silicone is used as the raw material component (B), so that the silicone particle contains a polyoxyalkylene group in the particle surface. Such polyoxyalkylene groups fixed to the surface of the particle can be observed by NMR analysis with heavy water.

The inventive silicone particle is preferably not sticky, and preferably has a rubber hardness of 5 to 90, more preferably 10 to 60 as measured by Type A Durometer according to JIS K 6253. When the rubber hardness is 5 or more, in particular, 10 or more, agglomeration property of such silicone particles does not become too high, so that the particles easily disperse to primary particles in the dispersion medium. Meanwhile, when the rubber hardness is 90 or less, in particular, 60 or less, the silicone particles can retain elastic characteristics.

Note that rubber hardness of the silicone particles cannot be measured using particles. Therefore, as a temporary measure, a cured material is made using the component (A) and the component (C) in the same ratio as in the Examples, and a test piece having the shape and dimensions defined in JIS K 6253 is fabricated. The value measured using the test piece is referred to as the rubber hardness.

The inventive silicone particle has rubber elasticity, has low agglomeration property, and has high dispersibility in water, and is therefore useful for aqueous cosmetics, aqueous paints, printed substrates, adhesives, etc.

EXAMPLE

Hereinafter, the present invention will be described specifically with reference to Examples and Comparative Examples. However, the present invention is not limited to the following Examples. Note that in the examples, the kinematic viscosity is the value measured at 25° C., and the "%" indicating concentration and content indicates "mass %". In addition, the evaluation of dispersibility was performed in the manner described below.

Example 1

75 g of a difunctional methacryl polysiloxane (component (A)) shown by the following formula (10) and having a kinematic viscosity of 180 mm²/s and 0.75 g of 2-hydroxy-2-methyl-1-phenyl-propan-1-one (Irgacure 1173 manufactured by BASF) (component (C)) were charged into a glass beaker having a capacity of 1 liter, and were stirred and dissolved by using a homomixer at 4000 rpm for 5 minutes. Next, 7.5 g of a difunctional methacryl polyethylene glycol-modified polysiloxane (component (B)) shown by the following formula (11) and having a kinematic viscosity of 160 mm²/s and 15 g of water were added thereto, and stirred using a homomixer at 7000 rpm. The obtained mixture was of an oil-in-water type, thickening was observed, and stirring was continued for a further 15 minutes. Subsequently, 51.75 g of water was added for dilution while stirring at 2000 rpm. The mixture was passed through a homogenizer under the condition of a pressure of 100 MPa to obtain a homogeneous white emulsion.

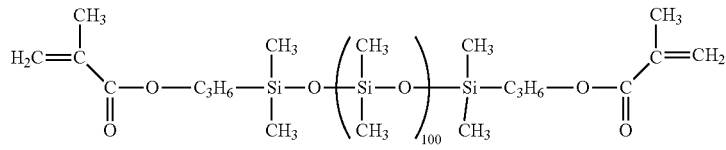

(10)

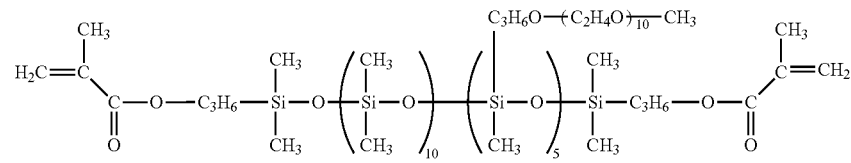

(11)

This emulsion was transferred to a glass flask equipped with an agitator having an anchor paddle and having a capacity of 0.5 liters, and the temperature was adjusted to 20 to 25° C. Then, a probe of an LED light source for photochemical reaction (wavelength: 356 nm, 507 mW) of Techno Sigma Co., Ltd. was inserted into the solution, and irradiation was started. By continuing the irradiation at the same temperature for 4 hours while stirring, an aqueous dispersion of silicone particles was obtained.

When the shape of the silicone particles in the obtained aqueous dispersion was observed with an optical microscope, the shape was spherical. When the volume average particle size was measured using an electric resistance method particle size distribution analyzer (Multisizer 3, manufactured by BECKMAN COULTER), the volume average particle size was 2 μm.

Furthermore, the hardness of the silicone elastomer constituting the silicone particles was measured as follows. 5 g of the methylvinylpolysiloxane shown by the formula (10) and 0.05 g of the 2-hydroxy-2-methyl-1-phenyl-propan-1-one (Irgacure 1173 manufactured by BASF) were mixed, and poured into a glass petri dish so as to have a thickness of 6 mm. Under a nitrogen atmosphere, the mixture was irradiated with a UV-LED irradiator (365 nm, 154 mW) for 5 minutes to obtain a silicone elastomer having no stickiness. When the hardness of the silicone elastomer was measured with a Durometer A hardness meter, the hardness was 18.

About 150 g of the aqueous dispersion of silicone particles was transferred to a 1-liter glass flask equipped with an agitator having an anchor paddle, and an aqueous solution of 475 g of water and 25 g of sodium sulfate was added thereto. After stirring this for 30 minutes, the washing water in a lower layer was removed. An aqueous solution of 475 g of water and 25 g of sodium sulfate was added again, and after stirring for 30 minutes, the washing water in a lower layer was removed to obtain an aqueous dispersion of silicone particles. Furthermore, the dispersion was washed twice with 1000 g of heated water of 70° C., and an approximately 15% aqueous dispersion of silicone particles was freeze-dried to obtain white silicone particles.

When the obtained silicone particles were dispersed in water without using a surfactant and measured using an electric resistance method particle size distribution analyzer (Multisizer 3, manufactured by BECKMAN COULTER), the particle size distribution was equivalent to that of the above-described aqueous dispersion of silicone particles, and the volume average particle size was 2 μm. When the silicone particles were observed with an electron microscope, it was observed that the silicone particles were spherical silicone elastomer particles. When the silicone particles were subjected to NMR analysis in heavy water, —($CH_2CH_2O$)— groups were detected, and it was judged that the silicone particles had a polydimethylsiloxane containing a polyoxyalkylene unit crosslinked to the surface of the silicone particles.

Example 2

An aqueous dispersion of silicone particles was obtained by the same method as in Example 1 except that a compound of the following formula (12) was used instead of the difunctional methacryl polysiloxane of the structural formula (10) used in Example 1.

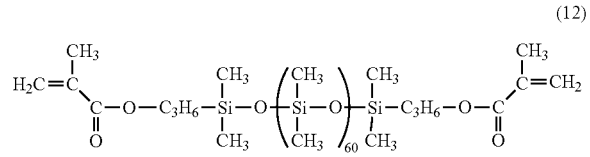

(12)

When the shape of the silicone particles in the obtained aqueous dispersion was observed with an optical microscope, the shape was spherical. When the volume average particle size was measured using an electric resistance method particle size distribution analyzer (Multisizer 3, manufactured by BECKMAN COULTER), the volume average particle size was 2 μm. In the same manner as in Example 1, a silicone elastomer was fabricated to measure hardness, and the hardness was 40. The volume average particle size of the silicone particles obtained by the same purifying method as in Example 1 was 2 μm. When these silicone particles were observed with an electron microscope, it was confirmed that the silicone particles were spherical silicone elastomer particles. When the silicone particles were subjected to NMR analysis in heavy water, —($CH_2CH_2O$)— groups were detected, and it was judged that the silicone particles had a polydimethylsiloxane containing a polyoxyalkylene unit crosslinked to the surface of the silicone particles.

Comparative Example 11

An aqueous dispersion of silicone particles was obtained by the same method as in Example 1 except that a compound of the following formula (13) was used instead of the methacryl polyethylene glycol-modified polysiloxane of the structural formula (11) used in Example 1.

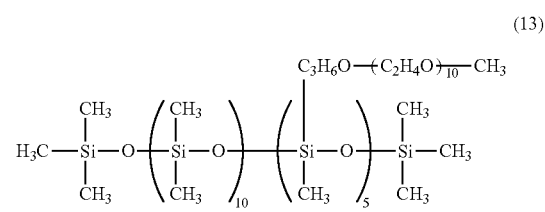

(13)

When the shape of the silicone particles in the obtained aqueous dispersion was observed with an optical microscope, the shape was spherical. When the volume average particle size was measured using an electric resistance method particle size distribution analyzer (Multisizer 3, manufactured by BECKMAN COULTER), the volume average particle size was 2 μm. In the same manner as in Example 1, a silicone elastomer was fabricated to measure hardness, and the hardness was 18. However, although silicone particles were obtained by the same purifying method as in Example 1, the silicone particles did not disperse in water on their own. Therefore, the volume average particle size was measured, using a common surfactant, and the volume average particle size was 2 μm. When these silicone particles were observed with an electron microscope, it was confirmed that the silicone particles were spherical silicone elastomer particles. However, when the silicone particles were subjected to NMR analysis in heavy water, no peak attributable to —($CH_2CH_2O$)— groups was detected.

It should be noted that the present invention is not limited to the above-described embodiments. The embodiments are just examples, and any examples that have substantially the same feature and demonstrate the same functions and effects as those in the technical concept disclosed in claims of the present invention are included in the technical scope of the present invention.

The invention claimed is:
1. A silicone particle comprising:
   a dialkylsiloxane unit represented by the following general formula (1),

$$R^4{}_2SiO_{2/2} \quad (1)$$

wherein in the formula (1), $R^4$s each independently represent a monovalent hydrocarbon group having 1 to 6 carbon atoms; and
   a poly(alkyleneoxyalkyl)methylsiloxane unit represented by the following general formula (2),

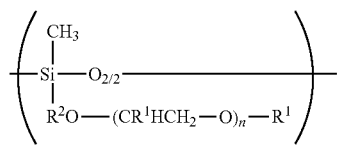
(2)

wherein in the formula (2), $R^1$s each independently represent a hydrogen atom or a monovalent hydrocarbon group having 1 to 6 carbon atoms, $R^1$s each independently represent a divalent aliphatic group having 1 to 6 carbon atoms, and "n" is a number that satisfies $1 \le n \le 20$,
   wherein the silicone particle has an oxyalkylene group in a surface thereof.

2. The silicone particle according to claim 1, having a volume average particle size of 0.1 to 100 μm.

3. A method for producing the silicone particle according to claim 2, the method comprising
   crosslinking, in a state of being dispersed in water, a radical polymerizable silicone composition containing the following components (A) to (C):
(A) 100 parts by mass of an organopolysiloxane having a radical polymerization reactive group shown in the following general formula (3),

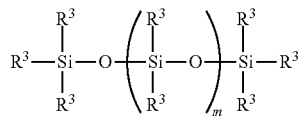
(3)

wherein in the formula (3), $R^1$s each independently represent a monovalent hydrocarbon group having 1 to 6 carbon atoms or a group represented by the following general formula (4a) or (4b), provided that at least one group represented by the following formula (4a) or (4b) is contained in one molecule, and "m" is a number that satisfies $0 \le m \le 1,000$,

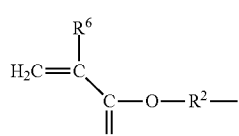
(4a)

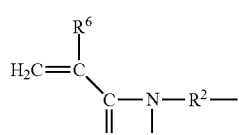
(4b)

wherein in the formulae (4a) and (4b), $R^6$ represents a hydrogen atom or a methyl group and $R^2$ represents a divalent aliphatic group having 1 to 6 carbon atoms;
(B) 0.1 to 100 parts by mass of a polyoxyalkylene-modified silicone having a radical polymerizable group shown in the following general formula (5),

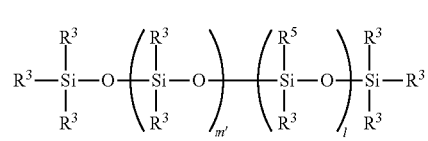
(5)

wherein in the formula (5), $R^3$ is as defined above and at least two groups represented by the following formula (4a) or (4b) are contained in one molecule, $R^3$ represents a polyethyleneoxyalkyl group represented by the following formula (7), "l" is a number that satisfies $1 \le l \le 300$, and "m'" is a number that satisfies $1 \le m' \le 1,000$,

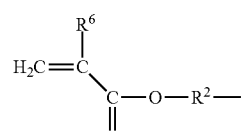
(4a)

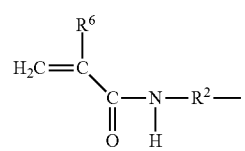
(4b)

wherein in the formulae (4a) and (4b), $R^6$ and $R^2$ are as defined above,

$$-R^2O(CR^1HCH_2O)n\text{-}R^1 \quad (7)$$

wherein in the formula (7), $R^1$s each independently represent a hydrogen atom or a monovalent hydrocarbon group having 1 to 6 carbon atoms, $R^1$s each independently represent a divalent aliphatic group having 1 to 6 carbon atoms, and "n" is a number that satisfies $1 \le n \le 20$; and
(C) 0.1 to 5 parts by mass of a radical generator.

4. The method for producing the silicone particle according to claim 3, wherein an organopolysiloxane having a radical polymerization reactive group shown in the following general formula (8) is used as the component (A),

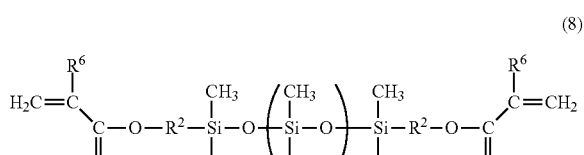
(8)

wherein in the formula (8), $R^2$ and $R^6$ are as defined above and "m" is a number that satisfies $0 \le m \le 1,000$.

5. The method for producing the silicone particle according to claim 4, wherein a polyoxyalkylene-modified silicone having a radical polymerizable group shown in the following structural formula (9) is used as the component (B),

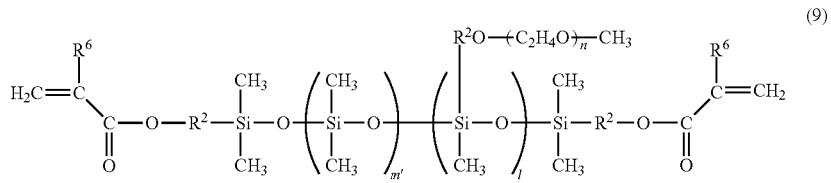

(9)

wherein in the formula (9), $R^2$ and $R^6$ are as defined above, "l" is a number that satisfies $1 \le l \le 300$, "m'" is a number that satisfies $1 \le m' \le 1{,}000$, and "n" is a number that satisfies $1 \le n \le 20$.

6. The method for producing the silicone particle according to claim 5, wherein the composition is cured by a heating method, a redox method, or a light irradiation method in the presence of the component (C) radical generator.

7. The method for producing the silicone particle according to claim 4, wherein the composition is cured by a heating method, a redox method, or a light irradiation method in the presence of the component (C) radical generator.

8. The method for producing the silicone particle according to claim 3, wherein a polyoxyalkylene-modified silicone having a radical polymerizable group shown in the following structural formula (9) is used as the component (B),

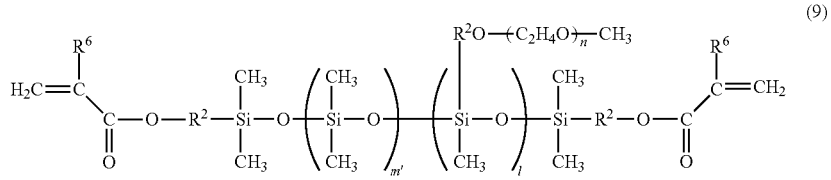

(9)

wherein in the formula (9), $R^2$ and $R^6$ are as defined above, "l" is a number that satisfies $1 \le l \le 300$, "m'" is a number that satisfies $1 \le m' \le 1{,}000$, and "n" is a number that satisfies $1 \le n \le 20$.

9. The method for producing the silicone particle according to claim 8, wherein the composition is cured by a heating method, a redox method, or a light irradiation method in the presence of the component (C) radical generator.

10. The method for producing the silicone particle according to claim 3, wherein the composition is cured by a heating method, a redox method, or a light irradiation method in the presence of the component (C) radical generator.

11. A method for producing the silicone particle according to claim 1, the method comprising
crosslinking, in a state of being dispersed in water, a radical polymerizable silicone composition containing the following components (A) to (C):
(A) 100 parts by mass of an organopolysiloxane having a radical polymerization reactive group shown in the following general formula (3),

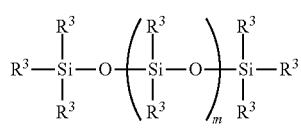

(3)

wherein in the formula (3), $R^1$s each independently represent a monovalent hydrocarbon group having 1 to 6 carbon atoms or a group represented by the following general formula (4a) or (4b), provided that at least one group represented by the following formula (4a) or (4b) is contained in one molecule, and "m" is a number that satisfies $0 \le m \le 1{,}000$,

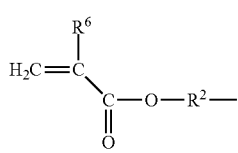

(4a)

-continued

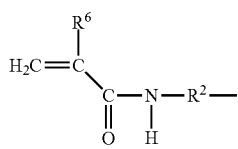

(4b)

wherein in the formulae (4a) and (4b), $R^3$ represents a hydrogen atom or a methyl group and $R^2$ represents a divalent aliphatic group having 1 to 6 carbon atoms;

(B) 0.1 to 100 parts by mass of a polyoxyalkylene-modified silicone having a radical polymerizable group shown in the following general formula (5),

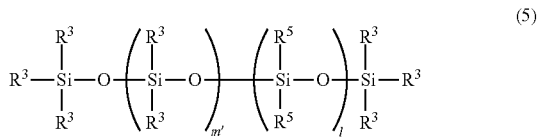

(5)

wherein in the formula (5), $R^5$ is as defined above and at least two groups represented by the following formula (4a) or (4b) are contained in one molecule, $R^5$ represents a polyethyleneoxyalkyl group represented by the following formula (7), "l" is a number that satisfies $1 \le l \le 300$, and "m'" is a number that satisfies $1 \le m' \le 1{,}000$,

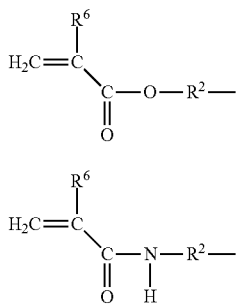

(4a)

(4b)

wherein in the formulae (4a) and (4b), $R^6$ and $R^2$ are as defined above, $$—R^2O(CR^1HCH_2O)n\text{-}R^1 \tag{7}$$

wherein in the formula (7), $R^1$s each independently represent a hydrogen atom or a monovalent hydrocarbon group having 1 to 6 carbon atoms, $R^1$s each independently represent a divalent aliphatic group having 1 to 6 carbon atoms, and "n" is a number that satisfies $1 \leq n \leq 20$; and (C) 0.1 to 5 parts by mass of a radical generator.

12. The method for producing the silicone particle according to claim 11, wherein an organopolysiloxane having a radical polymerization reactive group shown in the following general formula (8) is used as the component (A),

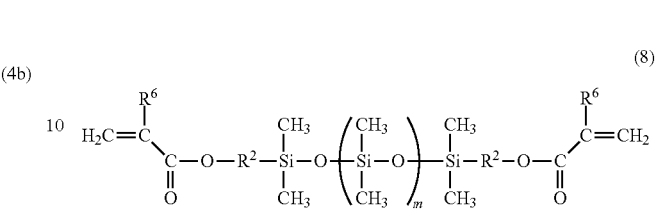

(8)

wherein in the formula (8), $R^2$ and $R^6$ are as defined above and "m" is a number that satisfies $0 \leq m \leq 1,000$.

13. The method for producing the silicone particle according to claim 12, wherein a polyoxyalkylene-modified silicone having a radical polymerizable group shown in the following structural formula (9) is used as the component (B),

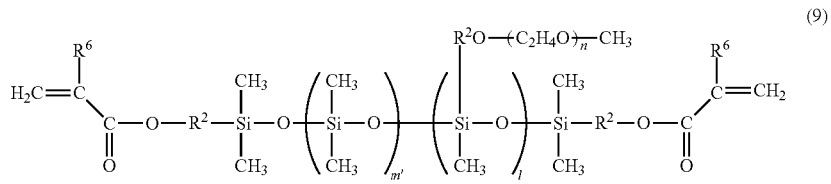

(9)

wherein in the formula (9), $R^2$ and $R^6$ are as defined above, "l" is a number that satisfies $1 \leq l \leq 300$, "m'" is a number that satisfies $1 \leq m' \leq 1,000$, and "n" is a number that satisfies $1 \leq n \leq 20$.

14. The method for producing the silicone particle according to claim 13, wherein the composition is cured by a heating method, a redox method, or a light irradiation method in the presence of the component (C) radical generator.

15. The method for producing the silicone particle according to claim 12, wherein the composition is cured by a heating method, a redox method, or a light irradiation method in the presence of the component (C) radical generator.

16. The method for producing the silicone particle according to claim 11, wherein a polyoxyalkylene-modified silicone having a radical polymerizable group shown in the following structural formula (9) is used as the component (B),

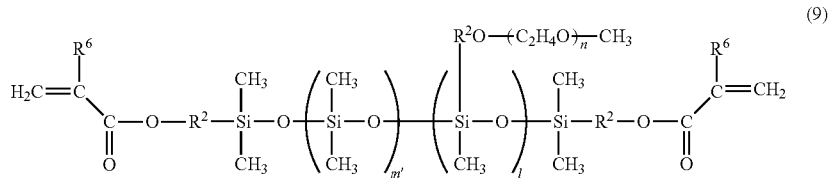

(9)

wherein in the formula (9), $R^2$ and $R^6$ are as defined above, "l" is a number that satisfies $1 \leq l \leq 300$, "m'" is a number that satisfies $1 \leq m' \leq 1,000$, and "n" is a number that satisfies $1 \leq n \leq 20$.

17. The method for producing the silicone particle according to claim 16, wherein the composition is cured by a heating method, a redox method, or a light irradiation method in the presence of the component (C) radical generator.

18. The method for producing the silicone particle according to claim 11, wherein the composition is cured by a heating method, a redox method, or a light irradiation method in the presence of the component (C) radical generator.

* * * * *